United States Patent
Butler et al.

(10) Patent No.: US 11,279,840 B2
(45) Date of Patent: Mar. 22, 2022

(54) INK COMPOSITIONS (71) Applicant: Hewlett-Packard Development Company, L.P., Spring, TX (US)

(72) Inventors: Thomas W. Butler, Corvallis, OR (US); Natalie Harvey, Corvallis, OR (US); Vladimir Jakubek, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 278 days.

(21) Appl. No.: 16/497,593

(22) PCT Filed: May 24, 2017

(86) PCT No.: PCT/US2017/034177
§ 371 (c)(1),
(2) Date: Sep. 25, 2019

(87) PCT Pub. No.: WO2018/217192
PCT Pub. Date: Nov. 29, 2018

(65) Prior Publication Data
US 2021/0009836 A1    Jan. 14, 2021

(51) Int. Cl.
*C09D 11/38* (2014.01)
*C09D 11/102* (2014.01)
*B41J 2/17* (2006.01)
*C09D 11/324* (2014.01)

(52) U.S. Cl.
CPC ............ *C09D 11/38* (2013.01); *B41J 2/1714* (2013.01); *C09D 11/102* (2013.01); *C09D 11/324* (2013.01)

(58) Field of Classification Search
CPC ..... C09D 11/38; C09D 11/324; B41M 5/0017
USPC .......................................... 106/31.6; 347/87
See application file for complete search history.

(56) References Cited

U.S. PATENT DOCUMENTS

| | | |
|---|---|---|
| 6,057,384 A | 5/2000 | Nguyen |
| 6,204,307 B1 * | 3/2001 | Miyabayashi ....... B41M 5/0017 106/31.6 |
| 6,329,446 B1 | 12/2001 | Sacripante et al. |
| 6,908,185 B2 | 6/2005 | Chen et al. |
| 7,744,205 B2 | 6/2010 | Sarkisian et al. |
| 2005/0195261 A1 | 9/2005 | Stelter et al. |
| 2006/0038867 A1 | 2/2006 | Valentini |
| 2007/0225401 A1 | 9/2007 | Sarkisian et al. |

(Continued)

FOREIGN PATENT DOCUMENTS

| | | |
|---|---|---|
| WO | 2012148421 | 11/2012 |
| WO | 2013095497 | 6/2013 |
| WO | 2015187180 | 12/2015 |

OTHER PUBLICATIONS

International Search Report dated Feb. 28, 2018 for PCT/US2017/034177, Applicant Hewlett-Packard Development Company, L.P.

*Primary Examiner* — Khanh T Nguyen
(74) *Attorney, Agent, or Firm* — Thorpe North & Western LLP (57) ABSTRACT

An ink composition can include carbon black pigment, from 50 wt % to 80 wt % water, from 15 wt % to 35 wt % organic solvent, from 0.25 wt % to 9 wt % free latex particles having an average particles size from 50 nm to 500 nm, from 0.1 wt % to 1 wt % C10 to C20 fatty acid, and lithium.

20 Claims, 2 Drawing Sheets

100 admixing carbon black pigment, free latex particles, C10 to C20 fatty acid, and lithium with a liquid vehicle including water and organic solvent, wherein the admixing results in an ink composition comprising from 50 wt% to 80 wt% water, from 0.25 wt% to 9 wt% free latex particles having an average particles size from 50 nm to 500 nm, and from 0.1 wt% to 1 wt% C10 to C20 fatty acid

110

(56) References Cited

U.S. PATENT DOCUMENTS

2014/0285593 A1\* 9/2014 Vasudevan ............. C09D 11/38
347/87

\* cited by examiner

INK COMPOSITIONS

BACKGROUND

Inkjet printing has become a popular way of recording images on various media. Some of the reasons include low printer noise, variable content recording, capability of high speed recording, and multi-color recording. These advantages can be obtained at a relatively low price to consumers. As the popularity of inkjet printing increases, the types of use also increase providing demand for new ink compositions.

DETAILED DESCRIPTION

Inkjet printing has been popular for home and office printing because of its low cost and overall quality. As printing speeds of inkjet printers increase and advancements in inkjet inks occur, these low cost printers are moving into areas where there would be a benefit of higher performance, e.g., high output quality, production of crisp prints on plain or porous paper, improved durability, etc. In particular, the durability of images generated using laser printing technologies tends to be greater than the durability of images generated using inkjet technologies, particularly with respect to image smear, e.g., highlighter smear, finger smudge, and/or finger scratch. Additionally, improving decap performance in inkjet inks can also be challenging, particularly when adding durability enhancing polymers to the ink composition.

In accordance with this, the present disclosure is drawn to an ink composition which can include carbon black pigment, from 50 wt % to 80 wt % water, from 15 wt % to 35 wt % organic solvent, from 0.25 wt % to 9 wt % free latex particles having an average particle size from 50 nm to 500 nm, from 0.1 wt % to 1 wt % C10 to C20 fatty acid, and lithium. In one example, the ink composition can further include from 0.5 wt % to 4 wt % polyurethane. In another example, the free latex particles can be present in the ink composition at from 3 wt % to 9 wt %. Particularly within this higher latex range, the polyurethane may not be present, but in other examples, the polyurethane can be present even within this higher latex range. The C10 to C20 fatty acid can be, for example, oleic acid, linoleic acid, undecanoic add, lauric acid, tridecanoic acid, or a combination thereof. Alternatively or additionally, the C10 to C20 fatty acid can include from 0.1 wt % to 0.4 wt % of a saturated fatty acid, and from 0.01 wt % to 0.1 wt % of an unsaturated fatty acid, e.g., a monounsaturated fatty acid. With respect to the lithium, it can be present as a lithium ion or a lithium salt. Examples of lithium sources that can be used to introduce the lithium include lithium chloride, lithium bromide, lithium iodide, lithium hydroxide, lithium acetate, lithium benzoate, lithium nitrate, lithium counterion of the carbon black pigment, or a combination thereof. The lithium can be present in the ink composition at from 0.005 wt % to 0.5 wt %. Furthermore, in certain examples, the organic solvent can include 1-(2-hydroxyethyl)-2-pyrrolidone, 2-pyrrolidone, or a combination thereof.

In another example, a method of making an ink composition can include admixing carbon black pigment, free latex particles, C10 to C20 fatty acid, and lithium with a liquid vehicle including water and organic solvent. The admixing can result in an ink composition comprising from 50 wt % to 80 wt % water, from 0.25 wt % to 9 wt % free latex particles having an average particle size from 50 nm to 500 nm, and from 0.1 wt % to 1 wt % C10 to C20 fatty acid. In one example, the admixing can further include adding from 0.5 wt % to 4 wt % polyurethane based on the ink composition content. The free latex particles can be present in the ink composition at from 3 wt % to 9 wt %. In some examples, the ink composition can be devoid of polyurethane, e.g., such as when the free latex particles may be present at from 3 wt % to 9 wt %. However, the inclusion of polyurethane tends to improve the durability of the ink compositions, so it can be present in the ink composition along with any free latex particle concentration described herein. In another example, the method can include a preliminary step of surface treating the carbon black pigment to form a surface ionized carbon black pigment for admixing with the liquid vehicle.

In another example, a printing system can include an ink composition and a fuser device. The ink composition can include carbon black pigment, from 50 wt % to 80 wt % water, from 15 wt % to 35 wt % organic solvent, from 0.25 wt % to 9 wt % free latex particles having an average particle size from 50 nm to 500 nm, from 0.1 wt % to 1 wt % C10 to C20 fatty acid, and lithium. The fuser device can apply heat and pressure to a print medium having the ink composition printed thereon. In one example, the ink composition can further include 0.5 wt % to 4 wt % polyurethane. With specific respect to the fuser device, this device can be a roller, for example, and the roller can contribute to providing heat to the print medium at from 80° C. to 230° C. and pressure to the print medium at from 50 psi to 500 psi. The roller can apply pressure against an opposing roller(s) or back roller(s), against a substrate, or against any other structure where pressure can be applied. The roller can be heated by infrared radiation or conduction, for example.

It is noted that when discussing the various ink compositions, methods, and systems described herein, each of these discussions can be considered applicable to the other examples, whether or not they are explicitly discussed in the context of that example. Thus, for example, in discussing a carbon black pigment related to an ink composition, such disclosure is also relevant to and directly supported in the context of the methods and/or systems described herein, and vice versa.

Thus, in accordance with the present disclosure, black inks or black inkjet inks can include carbon black pigment as the colorant, water and other liquid vehicle components, e.g., organic solvent, surfactant, biocide, monovalent salts (other than lithium salts), viscosity modifiers, etc. Additionally, the ink compositions can include decap controlling additives that improve decap performance, e.g., increase the amount of time an inkjet nozzle can remain uncapped without clogging and remaining generally healthy. Furthermore, in conjunction with these decap controlling additives, the addition of free latex particles to the ink compositions can improve print durability, particularly when a printed image undergoes fusing under heat and pressure. The presence of polyurethane as a binder can further assist with improving durability in some examples. The heat and pressure applied can be similar to that often used in laser printers (to fuse the image), e.g., from 180° C. to 200° C. at 100 psi to 250 psi. Alternatively, the heat and pressure can be applied within other ranges and combinations of ranges (heat and pressure), e.g., at a temperature from 80° C. to 250° C., from 100° C. to 230° C., from 120° C. to 210° C., or from 150° C. to 210° C.; and at a pressure from 50 psi to 500 psi, from 60 psi to 400 psi, or from 70 psi to 300 psi. In some instances, laser-like durability or near laser-like durability can be achieved.

Turning now to the specific ingredients that can be used, as noted, the ink composition can include a carbon black pigment. In one example, the carbon black pigment can be a self-dispersing carbon black pigment, or can be a carbon black pigment that can be dispersed by a separate dispersing agent. In another example, the carbon black pigment can be surface treated, such as by light, ultra-violet radiation, or ozone. The surface treatment can result in carbon black pigment with an ionized surface, also referred to herein as "ionized carbon black pigment." In one example, the surface treatment can be carried out by exposing the carbon black pigment to both light and ozone, resulting in small molecules being generated at the surface of the carbon black pigment.

The carbon black pigment can be present in the ink composition at various concentrations. In one example, the carbon black pigment can be present in the ink at from about 2 wt % to about 8 wt %. In another example, the carbon black pigment can be present at from about 3 wt % to about 5 wt %. In yet another example, the carbon black pigment can be present from about 4 wt % to about 5 wt %.

Free latex particles can also be present in the ink composition at from 0.25 wt % to 9 wt %. Other example ranges can include free latex particles present in the ink composition at from 1 wt % to 8 wt %, from 2 wt % to 7 wt %, from 3 wt % to 9 wt %, from 3 wt % to 7 wt %. The latex particles can be formed of homogenous latex polymers, e.g., same polymer throughout; core-shell latex polymers, e.g., a first polymer core with a different polymer shell; or multiple intermingled polymer strands. Notably, the general term "polymer" includes both homopolymers and copolymers. For clarity, "homogenous latex polymer" can refer to the homopolymer throughout of the same copolymer throughout; "core" can refer to a center portion of a polymer that can either be a homopolymer or a copolymer; "shell" can refer to an outer portion of polymer that can either be a homopolymer or a copolymer; and the term "polymer strand" can refer to either a homopolymer strand or a copolymer strand. Regardless of the type of free latex particles used, the particle size can be, on average, from 100 nm to 500 nm, from 125 nm to 350 nm, from 150 nm to 300 nm, or from 180 nm to 250 nm. As used herein, "free latex particle(s)," or "latex particles," or "latex" can be used interchangeably and refer to discrete polymeric particles dispersed in a liquid.

The monomers used to prepare the free latex particles can be vinyl monomers. In one example, the monomers can be selected from vinyl monomers, acrylate monomers, methacrylate monomers, styrene monomers, ethylene, vinyl chloride, vinylidene chloride, maleate esters, fumarate esters, itaconate esters combinations thereof, or mixtures thereof. In one aspect, the monomers can include acrylates, methacrylates, and/or styrenes. Additionally, in some examples, the monomers can include hydrophilic monomers such as acid monomers, as well as hydrophobic monomers.

More specifically, monomers that can be polymerized to form latexes, including homogenous latex particles, core-shell latex polymers, or multiple intermingled polymer strand-based latex particles include, without limitation, styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, derivatives thereof, or mixtures thereof. Acidic monomers that can be polymerized to form the latex particles include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, derivatives thereof, or mixtures thereof.

With specific reference to examples where free latex particles with multiple intermingled polymer strands are used, these individual strands (within the latex particle) can have different glass transition temperature (Tg) values. For example, the multiple intermingled polymer strands can include a low Tg polymer strand having a Tg below 50° C. and a high Tg polymer strand having a Tg at 50° C. or above. In one example, the glass transition temperature of the high Tg polymer strand can be from 50° C. to 150° C. greater than the glass transition temperature of the low Tg polymer strand. In another example, even though the glass transition temperatures can be different, the refractive index of the low Tg polymer strand can be close to the refractive index of the high Tg polymer strand, e.g., less than 5%, less than 3%, less than 1%.

The low Tg polymer strand can be prepared from multiple co-monomers. Such multiple co-monomers generally include 2 or more monomers. In one example, the high Tg polymer strand can be of different monomers, one or more common monomers, or the same monomers, e.g., the high Tg polymer strand can be prepared from the same monomers used in the preparation of the low Tg polymer strand but at a different ratio. In one example, the low Tg polymer strand can be polymerized from two monomers at a weight ratio ranging from 4:1 to 1:1 and the high Tg polymer strand can be polymerized from the same monomers at a weight ratio ranging from 2:3 to 1:19. The weight ratio of soft (low Tg)

to hard (high Tg) polymer strand can vary from 1:1 to 1:9. Varying the ratio can provide for different effective glass transition temperatures for the latex particle as a whole. Additionally, by using the same co-monomers for the multiple strands, the polymer strands can have a similar refractive index; by using three co-monomers, the polymer refractive index can be controlled with even greater accuracy while simultaneously controlling the glass transition temperature. In one example, the refractive index of the low Tg polymer strand can be within 5% of the refractive index of the high Tg polymer strand, within 3% of the refractive index of the high Tg polymer strand, within 1% of the refractive index of the high Tg polymer strand, or within 0.5% of the refractive index of the high Tg polymer strand. Additionally, the multiple co-monomers can be selected to have a refractive index within 5%, 3%, 1%, or 0.5% of one another when polymerized, for example.

Generally, the low Tg polymer strand and the high Tg polymer strand can have differing glass transition temperatures such that the resulting latex particulate provides hard and soft domains. In one example, the glass transition temperature of the low Tg polymer strand can be 20° C. or less. In another example, the Tg can be 0° C. or less. In still another example, the glass transition temperature of the high Tg polymer strand can be at 90° C. or above. In one aspect, the glass transition temperature can be above 100° C. Additionally, the difference in the glass transition temperature between the low Tg polymer strand and the high Tg polymer strand can be from 50° C. to 150° C. In one example, the difference can be from 70° C. to 140° C., and in another example, the difference can from 90° C. to 130° C. In another example, the difference can be from 100° C. to 120° C. In still another example, the difference can be from 50° C. to 100° C.

In some examples, the presence of the low Tg polymer strand does not have an appreciable impact on the glass transition temperature of the intermingled polymer latex particles compared to the glass transition temperature of the high Tg polymer strand. For example, when comparing the glass transition temperature of a homogenous latex particle to a latex particle with two intermingled polymer strands (where the homogenous latex particles is of the same polymer used as the high Tg polymer in the intermingled polymer latexparticles), similar glass transition temperatures can be present. Thus, in many cases, even though a homogenous latex particle lacks two distinct intermingled polymers, the effective glass transition temperature for both types of latex particles can remain about the same. This would not necessarily be the case with a core-shell latex particle, as both the core and the shell would retain their respective glass transition temperature. In the case of latex particles with intermingled polymer strands, on the other hand, there is no core and no shell per se. The intermingled polymers allow the latex particle to act in some respects as a homogenous polymer, particularly with respect to glass transition temperature, for example. As a further note, these particular latex particles with multiple intermingled strands are typically not in the form of interpenetrating polymer network (an IPN is a polymer comprising two or more networks which can be at least partially interlaced on a polymer scale, but not covalently bonded to each other). With these intermingled polymer latex particles, with more random intermingling, the higher Tg polymer can be plasticized by the lower Tg polymer, and the strength and jettability of the latex particles can be provided in large part from the higher Tg polymer.

Regardless of the type of latex particles used in the ink compositions of the present disclosure, the effective glass transition temperature of the latex particles can be from 30° C. to 150° C., from 40° C. to 120° C., or from 50° C. to 100° C., for example. In the case of homogenous latex polymers, and in the case of latex particles with multiple intermingled polymer strands (low Tg strands intermingled with high Tg strands), the effective glass transition temperature can be the temperature at which glass transition occurs to the homogenous polymer or intermingled strands as a whole. With respect to core-shell latex particles, on the other hand, the effective glass transition temperature can be the temperature at which glass transition occurs for the highest Tg polymer of the core-shell structure (which could be either the core or the shell).

Turning now to decap controlling additives that can be included in the ink compositions of the present disclosure, there are certain classes of additives that can be particularly useful in the ink compositions of the present disclosure. Improving "decap" performance can include increasing the amount of time an inkjet nozzle can remain uncapped between jetting events without clogging. Thus, certain decap controlling additives can work together in forming a temporary "cap," which has the effect of maintaining the ability of an inkjet nozzle to fire a full volume drop after periods of varying delay between firing events. Thus, the term "decap" refers to this property. In accordance with this, certain components can cause the ink compositions described herein to form an anti-evaporative layer during uncapped, non-use, at an interface between the air and the ink composition at a print orifice of a nozzle. Thus, by slowing down water and other volatile solvent evaporation at this very small orifice, decap performance can be improved. In some cases, latexes can reduce decap performance, but in accordance with the present disclosure, the decap controlling additives described here can still work well with latex-containing ink compositions.

In accordance with this, one or more C10 to C20 fatty acid(s) and lithium can be added to the ink compositions of the present disclosure as decap controlling additives. The C10 to C20 fatty acid can include a saturated fatty acid, an unsaturated fatty acid, a combination of multiple saturated fatty acids, a combination of multiple unsaturated fatty acids, or a combination of both an unsaturated and a saturated fatty acid. In one example, the fatty acid content (including any C10 to C20 fatty acid that may be present) can be from 0.1 wt % to 1 wt %. In one example, the saturated fatty acid can be present at from 0.09 to 0.9 wt % and an unsaturated fatty acid can be present at from 0.01 wt % to 0.1 wt %. In another example, the C10 to C20 fatty acid(s) can include oleic acid, linoleic acid, undecanoic add, lauric acid, tridecanoic acid, or a combination thereof. More specifically, the ink composition can include from 0.09 wt % to 0.9 wt % lauric acid and from 0.01 wt % to 0.1 wt % oleic acid, or alternatively, from 0.1 wt % to 0.5 wt % lauric acid and from 0.02 wt % to 0.06 wt % oleic acid.

With respect to the added lithium, it is to be understood that the lithium can be present in the composition as an ion in solution, or as a lithium salt of the acid. Thus, the lithium can be added to the ink composition in the form of a salt, for example, The lithium content (elemental content) in the ink composition, regardless of the source used to introduce the lithium ion or lithium salt to the ink, can be from 0.005 wt % to 0.5 wt %, from 0.01 wt % to 0.3 wt %, from 0.02 w % to 0.2 wt %, or from 0.02 w % to 0.1 wt %.

Though lithium can be included in the ink compositions of the present disclosure to enhance decap performance, notably, other alkali metals, e.g., sodium and potassium, can also be present in the ink composition as well. These can be introduced into the ink composition with other ingredients, or can be affirmatively added. However, it is to be understood that the lithium aids in forming the anti-evaporative layer; whereas other alkali metals that may be present do not necessarily function to aid in formation of the anti-evaporative layer, nor is there evidence that they particularly hinder formation of the anti-evaporative layer. Thus, they can typically be included for other formulation concerns without significant consequence to the decap performance.

In further detail regarding the decap controlling additives and how they interact with one another, the example of lauric acid and oleic acid can be illustrative. For example, both lauric and oleic acid components can arrange in the orifice of an inkjet printing nozzle at the air/ink interface, orienting non-polar tails away from solution. Lauric acid is a saturated fatty acid which can arrange at the surface while packing in a regular, close pattern. Oleic acid, on the other hand, is a mono-unsaturated, or kinked, slightly longer alkyl chain that can break up the regular packing of lauric acid. Thus, even though lauric acid can be effective for use alone, the addition of oleic acid can further help to moderate the strength of the "cap." Furthermore, the lithium can complex with the fatty acid(s) in the ink composition solution at the air/ink interface to further stabilize the arrangement of the fatty acid(s).

In certain examples, the inks can also include a polyurethane. The polyurethane tends to improve durability over and above that provided by the free latex particles. Thus, though the addition of polyurethane is not required, particularly at low concentrations of free latex particles, e.g., from 0.5 wt % to less than 3 wt %, it can provide significant durability enhancement. On the other hand, when the free latex particles may be present at from 3 wt % to 9 wt %, the durability can be acceptable without the addition of polyurethane, but durability can still be enhanced further by adding polyurethane to the ink composition.

The terms "polyurethane" or "polyurethane binder" can be used interchangeably, and include both more traditional polyurethanes as well as polyureas. For example, the polyurethane can include a double bond, polyurethane-graph polyol, etc. The polyurethane can be a graph polyol, such as Pluracol® (available from BASF). In another example, the polyurethane can include an acrylic functional group.

In some other examples, the polyurethane can include an acrylate-containing or methacrylate-containing monoalcohol bonded to the polymer backbone at one end, and an ionic stabilizing group bonded to the polymer backbone at the other end. The polymer can also or alternatively include an acrylate-containing or methacrylate-containing monoalcohol bonded to both ends of the polymer backbone. In still other examples, the polyurethane can include an ionic stabilizing group bonded to both ends of the polymer backbone. In one example, the polyurethane can include a majority of polymer strands with an acrylate-containing or methacrylate-containing monoalcohol bonded to one end of the polymer backbone and an ionic stabilizing group bonded to the other end of the polymer backbone. Further, any combination of these end groups can be used as may be usable with the inks of the present disclosure.

In other examples, the polyurethane can be more pH-stable when particular types of monomers may or may not be included in the polymer backbone and the capping units. In one example, the polymer backbone can be free of ionic stabilizing groups. In particular, the polymer backbone can be devoid of monomers that contain acidic functional groups. In this example, the polyurethane dispersion can include ionic stabilizing groups in the capping units, but not on the polymer backbone. In a specific example, the polymer backbone can be devoid of carboxylate and sulfonate groups.

In still other examples, the polyurethane can be any of a number of polyurethanes that include an isocyanate, and a chain extender leading to either a linear or branched polymer, as well as cycloaliphatic or cycloaromatic components.

The weight average molecular weight of the polyurethane in the composition can vary. In one example, the polyurethane can have an average molecular weight ranging from about 3,000 Mw to about 70,000 Mw. In yet another example, the average molecular weight of the polyurethane can range from about 15,000 Mw to about 50,000 Mw. In a further example, the polyurethane can have an average molecular weight ranging from about 5,000 Mw to about 25,000 Mw. The polyurethane may have a minimum film-forming temperature from −50° C. to 80° C. In other examples, the polyurethane can have a minimum film-forming temperature from −30° C. to 60° C. or from −25° C. to 50° C.

As mentioned, the ink compositions can include from about 0.1 wt % to 4 wt % of the polyurethane. In other examples, the compositions can include from 0.5 wt % to 2 wt % polyurethane, from 1 wt % to 3 wt % polyurethane, from about 0.1 wt % to about 1.2 wt % polyurethane, or from 0.1 wt % to 1 wt % polyurethane. In a further example, the ink compositions can be devoid of binders other than polyurethane (and other than the free latex particles, which are present in the ink compositions of the present disclosure).

The polyurethane to carbon black pigment ratio in the ink compositions can also vary. In one example, the polyurethane to carbon black pigment ratio can range from about 1:10 to about 1:2. In another example, the polyurethane to carbon black pigment ratio can range from about 1:8 to about 1:2. In yet another example, the polyurethane to carbon black pigment ratio can range from about 1:6 to about 1:2. In a further example, the polyurethane to carbon black pigment ratio can range from about 1:5 to about 1:2.

Turning now to the liquid vehicle components, in examples of the present disclosure, the water content in the ink composition can be from 50 wt % to 80 wt %. In another example, the water content can be from 60 wt % to 80 wt %. In yet another example, the water content can be from 65 wt % to 75 wt %. In one example, the water can be deionized, purified, or a combination thereof.

In accordance with examples of the present disclosure, in addition to the water, the liquid vehicle can include an organic solvent, such as 2-pyrrolidone; 1-(2-hydroxyethyl)-2-pyrrolidone; diethyleneglycol, triethyleneglycol; tetraethylene glycol; 1-(2-hydroxyethyl)-2-imidazolidinone; di-(2-hydroxyethyl)-5,5-dimethylhydantoin (commercially available as Dantocol® DHE from Lonza, Inc., Allendale, N.J.); triethyleneglycol monoethyl ether; tetraglyme; glycerol polyoxyethyl ethers (e.g., ethoxylated glycerins, such as Liponic® EG-7 (LEG-7), commercially available from Lipo Chemicals, Inc., Paterson, N.J.); or combinations thereof. In one specific example, the organic solvent can include 1-(2-hydroxyethyl)-2-pyrrolidone. In another example, the organic solvent can include 2-pyrrolidone. In another example, the organic solvent can include both 1-(2-hydroxyethyl)-2-pyrrolidone and 2-pyrrolidone. Furthermore, the ink compositions can include these and/or any other organic solvent that provides a benefit to the ink compositions of the present disclosure, e.g., jettability, surface wetting, antikogation, curl reduction, etc. Regardless of the organic solvent(s) selected for use, the total organic solvent content in the ink composition can be from 15 wt % to 35 wt % in one example, and in another example, from 20 wt % to 30 wt %.

In some examples, the ink compositions can further include a surfactant as part of the liquid vehicle. In one example, the surfactant can include Surfynol® 104, Surfynol® 440, (both available from Air Products and Chemicals Inc., Pennsylvania), Surfadone™ LP-100 (available from Ashland® Inc., Kentucky), BYK® 3410, BYK® 3400 (both available from BYK® USA Inc. Connecticut), or a combination thereof. The surfactant or combinations of surfactants can be present in the ink composition at from about 0.001 wt % to about 10 wt %, and in some examples, can be present at from about 0.001 wt % to about 5 wt %. In other examples the surfactant or combinations of surfactants can be present at from about 0.01 wt % to about 3 wt % in the ink composition. In other examples, the ink composition can be devoid of surfactant.

The surfactant can be a non-ionic surfactant. Some specific examples of the non-ionic surfactant that may be used in the ink composition disclosed herein include acetylene diols, bis-tartrate esters, 1,2-hexanediol, mono alcohols, N-alkylpyrrolidinones, and combinations thereof. One example of the acetylene diol is Surfyonol® 104 (Products and Chemicals Inc., Pennsylvania). Examples of suitable bis-tartrate esters include diisoamyl tartrate, dibutyl tartrate, dibenzyl tartrate, and diisopropyl tartrate. Some examples of suitable mono alcohols include lauryl alcohol (i.e., 1-dodecanol), oleyl alcohol (i.e., octadec-9-en-1-ol), stearyl alcohol (i.e., 1-octadecanol), and combinations thereof. Examples of the N-alkylpyrrolidinone include N-octylpyrrolidinone and N-dodecylpyrrolidinone. Some commercially available N-alkylpyrrolidinones include Surfadone™ LP-100 (octylpyrrolidinone) and Surfadone™ LP-300 (dodecylpyrrolidinone) (both available from Ashland® Inc., Kentucky). In one example, the non-ionic surfactant that is selected can exclude ethyleneoxy groups.

Consistent with the ink compositions of the present disclosure, various other additives can be included to enhance properties of the ink composition for specific applications. Examples of these additives can include other liquid vehicle components as well as other solids, including other polymers, anti-microbial agents, UV compositions, sequestering agents, buffers, viscosity modifiers, and/or other ink composition additives. In more specific detail, additive(s) to inhibit the growth of harmful microorganisms can be included, such as biocide, fungicide, or other microbial agent can be included. Examples of suitable anti-microbial agents can include, but are not limited to, Acticide® (Thor Specialties Inc., Connecticut), Nuosept™ (Troy Corporation, New Jersey.), Ucarcide™ (Union Carbide Corp., Texas), Vancide® (Vanderbilt Minerals, LLC, Connecticut), Proxel® (Lonza Group Ltd., Maryland), and combinations thereof. In another example, sequestering agents such as EDTA (ethylene diamine tetra acetic acid) can be included to eliminate the deleterious effects of heavy metal impurities. In yet another example, buffer solutions can be used to control the pH of the ink.

Figure 1:
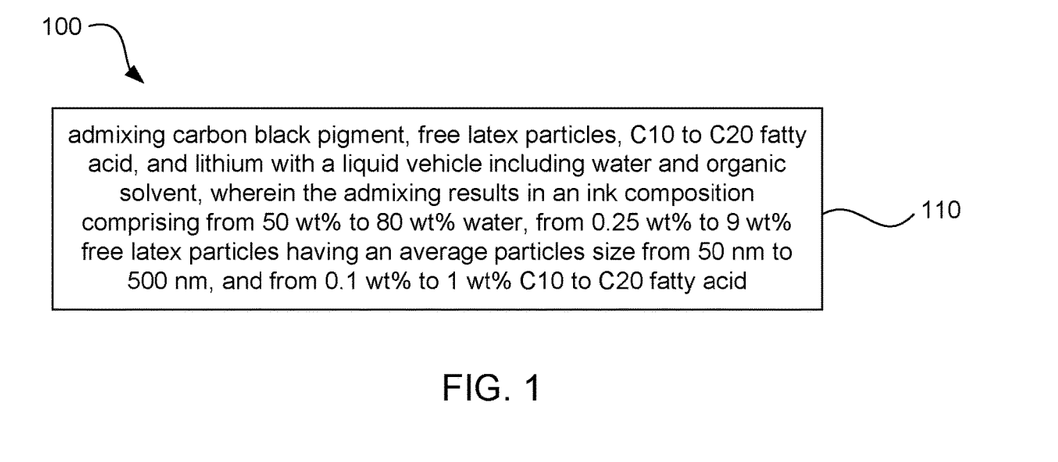
FIG. 1 provides an example method of making an inkjet composition in accordance with the present disclosure.

Turning now to the figures, a method of making an ink composition 100 is shown in FIG. 1. The method can include admixing 110 carbon black pigment, free latex particles, C10 to C20 fatty acid, and lithium with a liquid vehicle including water and organic solvent. The admixing can result in an ink composition including from 50 wt % to 80 wt % water, from 0.25 wt % to 9 wt % free latex particles having an average particle size from 50 nm to 500 nm, and from 0.1 wt % to 1 wt % C10 to C20 fatty acid.

Figure 2:
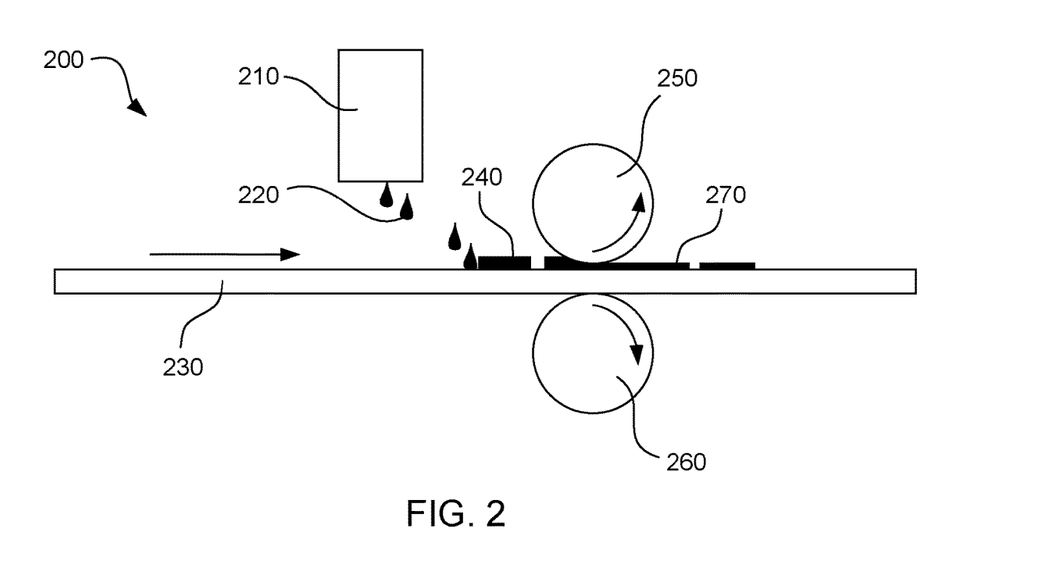
FIG. 2 shows an example printing system in accordance with the present disclosure.

FIG. 2 depicts a printing system 200, which includes an ink composition 220 and a fuser device, shown generally at 250 and 260. In one example, the ink composition can be printed from an inkjet cartridge 210. The ink composition can include carbon black pigment, from 50 wt % to 80 wt % water, from 15 wt % to 35 wt % organic solvent, from 0.25 wt % to 9 wt % free latex particles having an average particle size from 50 nm to 500 nm, from 0.1 wt % to 1 wt % C10 to C20 fatty acid, and lithium. In one example, the ink composition can also include from 0.5 wt % to 4 wt % polyurethane. The fuser device can include a roller 250, and the roller can contribute to providing heat and pressure to printed ink 240 printed on the print medium, e.g., temperature from 80° C. to 230° C. and pressure from 50 psi to 500 psi. In further detail, the fuser device can also include an opposing roller or back roller 260, which can also assist in providing pressure to the printed ink on the print medium. Thus, in one example, the roller provides heat and pressure to the printed ink composition on the print medium, and the back roller provides pressure thereto in combination with the roller. In another example, the back roller can also provide heat. Once heat and pressure are applied to the printed ink, a fused printed image 270 remains on the print medium that can have enhanced durability, e.g., laser-like or near laser-like durability. In a more detailed example, the roller can be a metal roller that can be heated internally using an infrared lamp to provide the heat. This heated roller can be paired with the back roller, which can be a rubber roller, for example, that provides pressure when pressed against the roller. When the printed ink is passed through the fusing system, or heat and pressure zone, the effect on printed ink can be two-fold, mechanical and thermal.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

"Media," "medium," or "print medium," includes any base material that is suitable for printing. In one example, the medium can be plain paper or uncoated paper. In another example, the medium can be porous coated paper.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is only exemplary or illustrative of the formulations, methods, and systems described herein. Numerous modifications may be devised by those skilled in the art without departing from the scope of the present disclosure. The appended claims are intended to cover such modifications and arrangements. Thus, while the present disclosure has been described above with particularity, the following examples provide further detail in connection with what are presently deemed to be the acceptable examples.

Example 1

Preparation of Free Latex Particles

The preparation of three different types of free latex particles suitable for use in accordance with examples of the present disclosure are prepared. Notably, four different free latex particle preparations (of three types) are shown, namely the preparation of two different latexes including multiple intermingled polymers, one latex of a homogenous polymer, and one latex of a core-shell polymer are provided.

Latex A (Intermingled Polymer Strands)

A latex particulate is prepared as follows. Water (169 g) is heated to 77° C. with mechanical agitation. An aqueous emulsion comprised of water (13.7 g), copolymerizable surfactant Hitenol BC-10 (0.70 g) (Dai-Ichi Kogyo Seiyaku Co., Ltd), styrene (17.7 g) and butyl acrylate (37.5 g) is prepared. At 77° C., 2 g (3%) of this monomer emulsion is added to the reactor followed by 0.37 g potassium persulfate (dissolved in a minimal amount of water). After 15 minutes, this monomer mixture is added to the reactor over 72 minutes. When the first polymerization is completed, a second emulsion comprised of water (34.9 g), copolymerizable surfactant Hitenol BC-10 (1.6 g), styrene (21.1 g), methyl methacrylate (99.0 g), butyl acrylate (6.1 g) and methacrylic acid (2.6 g) is added over 168 minutes. Residual monomer is reduced using ascorbic acid and t-butyl hydroperoxide. After cooling to near ambient temperature, pH is adjusted to ~8 with dilute potassium hydroxide; inkjet suitable aqueous biocides are added. The two monomer compositions' average homopolymer refractive indices are 1.5± 0.2. The resulting acrylic latex is 41% solids; particle size 0.23μ, viscosity <50 cps and has a latex structure of intermingled polymer strands.

Latex B (Intermingled Polymer Strands)

A latex particulate is prepared as follows. Water (169 g) is heated to 77° C. with mechanical agitation. An aqueous emulsion comprised of water (34.9 g), copolymerizable surfactant Hitenol BC-10 (1.6 g) (Dai-Ichi Kogyo Seiyaku Co., Ltd), styrene (21.1 g), methyl methacrylate (99.0 g), butyl acrylate (6.1 g) and methacrylic acid (2.6 g) is prepared. At 77° C., 2 g (1.4%) of the monomer emulsion is added to the reactor followed by 0.37 g potassium persulfate (dissolved in a minimal amount of water). After 15 minutes, this monomer mixture is added over 168 minutes. When the first polymerization is completed, a second emulsion comprised of water (13.7 g), copolymerizable surfactant Hitenol BC-10 (0.70 g), styrene (17.7 g) and butyl acrylate (37.5 g) is added over 72 minutes. Residual monomer is reduced by typical methodology using ascorbic acid and t-butyl hydroperoxide. After cooling to near ambient temperature, pH is adjusted to ~8 with dilute potassium hydroxide; inkjet suitable aqueous biocides are added. The two monomer compositions' average homopolymer refractive indices are 1.5± 0.2. The resulting acrylic latex is 41% solids; particle size 0.23μ; viscosity <50 cps and has a latex structure of intermingled polymer strands.

Latex C (Homogenous Polymer)

A latex particulate is prepared as follows. Water (125 g) is heated to 77° C. with mechanical agitation. An aqueous emulsion comprised of water (29.5 g), copolymerizable surfactant Hitenol BC-10 (1.5 g) (Dai-Ichi Kogyo Seiyaku Co., Ltd), methyl methacrylate (88.9 g), styrene (25.5 g) and butyl acrylate (4.7 g), methacrylic acid (0.6 g) is made. At 77° C., 2 g (1%) of this monomer emulsion is added to the reactor followed by 0.12 g potassium persulfate (dissolved in a minimal amount of water). After 15 minutes, this monomer mixture is added to the reactor over 180 minutes. Residual monomer is reduced using ascorbic acid and t-butyl hydroperoxide. After cooling to near ambient temperature, pH is adjusted to ~8 with dilute potassium hydroxide; inkjet suitable aqueous biocides are added. The resulting acrylic latex is 41% solids; particle size 0.22μ; viscosity <50 cps and has a homogenous latex structure.

Latex D (Core-Shell Polymer) [0051]A latex particulate is prepared as follows. Water (191.6 g) is heated to 77° C. with mechanical agitation. An aqueous emulsion comprised of water (16.6 g), copolymerizable surfactant Hitenol BC-10 (0.35 g) (Dai-Ichi Kogyo Seiyaku Co., Ltd), methyl methacrylate (21.1 g), 2-ethylhexyl acrylate (49.3 g) and tetra-ethyleneglycol dimethacrylate (1.4 g) is prepared. At 77° C., 2.7 g (3%) of this monomer emulsion is added to the reactor followed by 0.37 g potassium persulfate (dissolved in a minimal amount of water). After 15 minutes, the monomer emulsion mixture is added over 180 minutes. When the first polymerization is completed, a second emulsion comprised of water (21.5 g), copolymerizable surfactant Hitenol BC-10 (1.3 g), styrene (50.2 g), methyl methacrylate (50.4 g), butyl acrylate (5.0 g) and methacrylic acid (0.5 g) is added over 90 minutes. Residual monomer is reduced by typical methodology using ascorbic acid and t-butyl hydroperoxide. After cooling to near ambient temperature, pH is adjusted to ~8 with dilute potassium hydroxide; inkjet suitable aqueous biocides are added. The two monomer compositions' homopolymer refractive indices are 1.45 and 1.54, resp. The resulting acrylic latex is 41% solids; particle size 0.23 μm; viscosity <50 cps and has a core-shell structure.

Example 2

Preparation of Inks Compositions for Durability Comparison

Several ink compositions were prepared to evaluate the impact of added free latex particles to ink composition durability. The free latex particles used were similar to Latex A and Latex B, both of which were latex particles of multiple intermingled polymer stands. In some examples, a polyurethane binder was also added at a consistent concentration (1.7 wt %), and in other examples, a polyurethane binder was not included (0 wt %). Additionally, each of the ink compositions included a package of decap controlling additives, namely lauric acid, oleic acid, and lithium. The inks are more specifically set forth in Table 1 (no polyurethane) and Table 2 (with added polyurethane), as follows:

TABLE 1

| Ingredient | Class | Ink A (wt %) | Ink B (wt %) | Ink C (wt %) | Ink D (wt %) | Ink E (wt %) | Ink F (wt %) |
|---|---|---|---|---|---|---|---|
| 1-(2-hydroxyethyl)-2-pyrolidone | Solvent | 16 | 16 | 16 | 16 | 16 | 16 |
| 2-pyrrolidone | Solvent | 8 | 8 | 8 | 8 | 8 | 8 |
| Surfynol ® 104 | Surfactant | 0.05 | 0.05 | 0.05 | 0.05 | 0.05 | 0.05 |
| Surfadone ™ LP100 | Surfactant | 0.05 | 0.05 | 0.05 | 0.05 | 0.05 | 0.05 |
| Lauric Acid | Decap Contr. Additive | 0.26 | 0.26 | 0.26 | 0.26 | 0.26 | 0.26 |
| Oleic Acid | Decap Contr. Additive | 0.03 | 0.03 | 0.03 | 0.03 | 0.03 | 0.03 |
| Lithium | Decap Contr. Additive | 0.03 | 0.03 | 0.03 | 0.03 | 0.03 | 0.03 |
| Acticide ® B20 | Biocide | 0.2 | 0.2 | 0.2 | 0.2 | 0.2 | 0.2 |
| Acticide ® M20 | Biocide | 0.07 | 0.07 | 0.07 | 0.07 | 0.07 | 0.07 |
| Carbon Black | Pigment | 4.4 | 4.4 | 4.4 | 4.4 | 4.4 | 4.4 |
| Free Latex Particles | Latex | 0 | 0.5 | 1.5 | 3 | 5 | 7 |
| Water | Water | Balance | Balance | Balance | Balance | Balance | balance |

Surfynol ® 104 is available from Air Products and Chemical, Inc.
Surfadone ™ LP100 is available from Ashland
Acticide ® B20 and M20 are available from Thor

TABLE 2

| Ingredient | Class | Ink G (wt %) | Ink H (wt %) | Ink I (wt %) | Ink J (wt %) | Ink K (wt %) |
|---|---|---|---|---|---|---|
| 1-(2-hydroxyethyl)-2-pyrolidone | Solvent | 16 | 16 | 16 | 16 | 16 |
| 2-pyrrolidone | Solvent | 8 | 8 | 8 | 8 | 8 |
| Surfynol ® 104 | Surfactant | 0.05 | 0.05 | 0.05 | 0.05 | 0.05 |
| Surfadone ™ LP100 | Surfactant | 0.05 | 0.05 | 0.05 | 0.05 | 0.05 |
| Lauric Acid | Decap Contr. Additive | 0.26 | 0.26 | 0.26 | 0.26 | 0.26 |
| Oleic Acid | Decap Contr. Additive | 0.03 | 0.03 | 0.03 | 0.03 | 0.03 |
| Lithium | Decap Contr. Additive | 0.03 | 0.03 | 0.03 | 0.03 | 0.03 |
| Acticide ® B20 | Biocide | 0.2 | 0.2 | 0.2 | 0.2 | 0.2 |
| Acticide ® M20 | Biocide | 0.07 | 0.07 | 0.07 | 0.07 | 0.07 |
| Carbon Black | Pigment | 4.4 | 4.4 | 4.4 | 4.4 | 4.4 |
| Free Latex Particles | Latex | 0.5 | 1.5 | 3 | 5 | 7 |
| Polyurethane | Binder | 1.7 | 1.7 | 1.7 | 1.7 | 1.7 |
| Water | Water | Balance | Balance | Balance | Balance | balance |

Surfynol ® 104 is available from Air Products and Chemical, Inc.
Surfadone ™ LP100 is available from Ashland
Acticide ® B20 and M20 are available from Thor

Example 3

Highlighter Smear Durability

The ink compositions in Tables 1 and 2 (Inks A-K) were printed, fused and tested for their durability using the two-pass highlighter spear testing protocol described hereinafter. Identical text images were printed with an ink flux at about 60 ng/300$^{th}$ of an inch using standard characters (Times New Roman font; 12 point font size) followed by a larger circle having a very thin circumference line (printed using a HP® Officejet® Pro 8000 inkjet printer available from Hewlett-Packard, Co., California). The printing occurred using HP® Multipurpose paper media with ColorLok Technology® (also available from Hewlett-Packard, Co., California). The printed image was then subjected to heat and pressure (180° C.; 100 psi) to fuse the ink on the print medium. Essentially, a fusing device including a pair of fusing rollers (one of which was heated, and both of which provided pressure on the printed image) impinged the print with pressure and provided heat above the glass transition temperature, Tg, of the latex particles to cause the latex to fuse.

After fusing, a two-pass highlighter smear test was conducted on each of Inks A-K. The durability test was a two-pass highlighter smear test. The printed images were allowed to dry for one hour. After drying, a standard yellow Faber-Castell® highlighter (available from Faber-Castell® Aktiengesellschaft, Germany) was passed over the image at 500 grams weight pressure, two times. The smear was measured using a portable GretagMacbeth® Spectrolino® densitometer (discontinued, previously available from X-Rite®, Inc., Missouri) to determine the milli-optical density (mOD) of the smear trail. A high mOD value indicated a greater degree of smearing and a less durable ink composition, and a low mOD value indicated less smearing and a more durable inkjet ink composition. In addition to the perpendicular friction of the pen tip itself, there is also the effect of the highlighting fluid wetting the printed medium. With many inkjet inks, when a printed area is abraded and wetted, the pigment tends to migrate with the highlighter tip across the media. The amount of migrated pigment thus causes a measurable trailing mark or smear in the breaks between printed characters (and around the printed characters). This migrated pigment is then measured.

Figure 3:
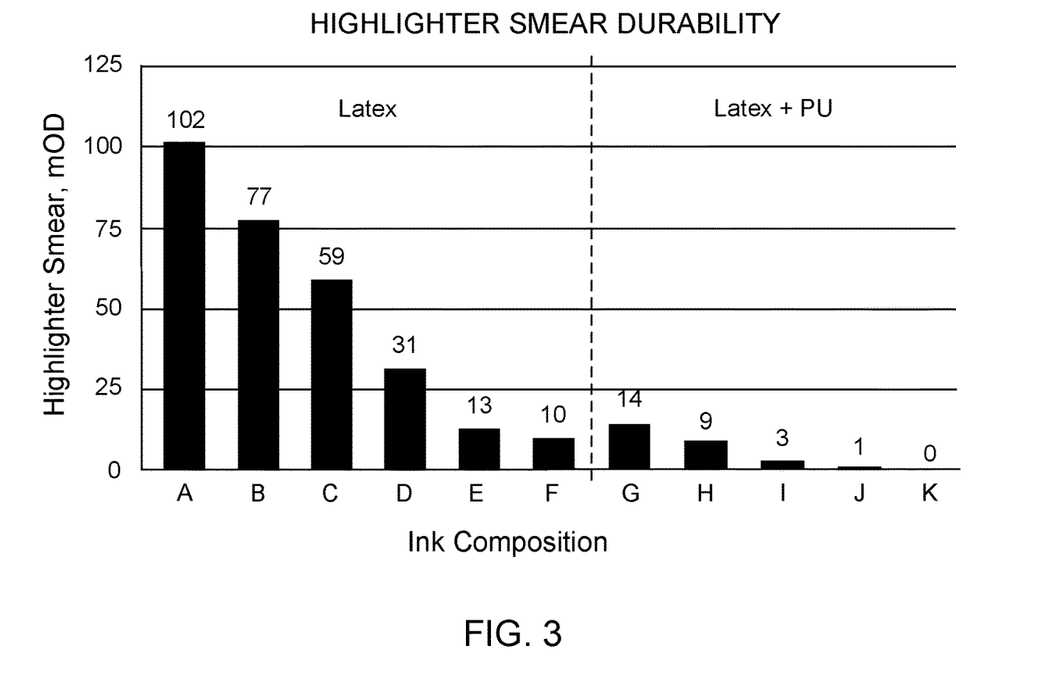
FIG. 3 provides example durability data of several examples of ink compositions prepared in accordance with the present disclosure.

The data for the two-pass highlighter smear test is provided in FIG. 3 in units of optical density (milli-OD, mOD). With this test, the lower the score, the better, as highlighter smear is measured just next to the printed characters (about 1 mm away from the characters). Thus, if there is no measurable smear, the mOD measurement would be the color of the highlighted print medium where measured. For comparison, a laser printed image is highlighted and measured, providing a score of 0 mOD as a reference. Thus, any measured mOD that performs as well as a laser printed image would also score a 0 mOD by comparison.

An mOD value of less than about 40 mOD is considered to be a good score, whereas an mOD value of less than about 20 mOD is considered to be a very good score. An mOD value of 0 mOD (or even 1 mOD or 3 mOD) are considered to be excellent scores. As can be seen by the data, without the presence of polyurethane as a binder, at 3 wt % latex particles or greater (tested up to 7 wt %), good to very good scores were achieved, e.g., 31 mOD (3 wt %), 13 mOD (5 wt %), and 10 mOD (7 wt %). Even with low concentrations of latex, e.g., from 0.5 wt % to less than 3 wt %, the latex provided some improvement over inks without the latex and without the polyurethane. However, when polyurethane binder was added, latex particles added at as low as 0.5 wt % (tested up to 7 wt %) provided from very good to excellent durability scores, e.g., 14 mOD (0.5 wt %), 9 mOD (1.5 wt %), 3 mOD (3 wt %), 1 mOD (5 wt %), and 0 mOD (7 wt %). Thus, surprisingly, Inks I-K performed at near laser-like or laser-like durability levels.

Example 4

Preparation of Ink Compositions for Decap Performance Comparison

Three ink compositions (Inks L-M) were prepared to evaluate the impact of the added free latex particles on decap performance. In other words, though the addition of the latex particles can improve durability as shown in Example 3, the present example was used to determine whether the added latex particles would adversely impact the decap performance of the ink compositions. The three formulations tested were similar, except Ink L included a decap controlling additive package but did not include the free latex particles, Ink M included both the decap controlling additive package and the free latex particles, and Ink N included the free latex particles but did not include the decap controlling additive package. The ink formulations are provided in Table 3, as follows:

TABLE 3

| Ingredient | Class | Ink L (wt %) | Ink M (wt %) | Ink N (wt %) |
|---|---|---|---|---|
| 1-(2-hydroxyethyl)-2-pyrolidone | Solvent | 13.7 | 13.7 | 13.7 |
| 2-pyrrolidone | Solvent | 8 | 8 | 8 |
| Surfynol ® 104 | Surfactant | 0.05 | 0.05 | 0.05 |
| Surfadone ™ LP100 | Surfactant | 0.05 | 0.05 | 0.05 |
| Lauric Acid | Decap Contr. Additive | 0.18 | 0.18 | — |
| Oleic Acid | Decap Contr. Additive | 0.03 | 0.03 | — |
| Lithium | Decap Contr. Additive | 0.0212 | 0.212 | — |
| Acticide ® B20 | Biocide | 0.2 | 0.2 | 0.2 |
| Acticide ® M20 | Biocide | 0.07 | 0.07 | 0.07 |
| Carbon Black | Pigment | 4.4 | 4.4 | 4.4 |
| Free Latex Particles | Latex | — | 5 | 3 |
| Polyurethane | Binder | 1.7 | 1.7 | 1.7 |
| Water | Water | Balance | Balance | Balance |

Surfynol ® 104 is available from Air Products and Chemical, Inc.
Surfadone ™ LP100 is available from Ashland
Acticide ® B20 and M20 are available from Thor The decap controlling additive package used in Inks L and M included multiple components that worked reliably together for the recovery of nozzles after sitting idle between firing events. Ink N did not include this decap controlling additive package. The ability of the nozzles to recover was monitored from one third of a second after twelve seconds of idle time. This timeframe covers the typical time nozzles may remain idle without a firing event. Grading of decap package performance is done visually by viewing the printed image.

In this example, decap performance was measured with and without the free latex particles, as well as with and without the decap controlling additive package. In the ink composition with the decap controlling additive package and without the free latex particles (Ink L), the nozzles were able to quickly recover fully even after a twelve second delay of printing. This is well beyond what is considered to be acceptable performance. With the addition of the free latex particles and the decap controlling additive package (Ink M), after twelve seconds of printing delay, there was some degradation in the first few lines of printing, but full recovery occurred thereafter. This performance is still beyond what is considered to be acceptable decap performance. Finally, it was shown that the addition of the free latex particles without the decap controlling additive package (Ink N) resulted in significant degradation in both twelve second delay and zero second delay prints, even with less polyurethane compared to Ink M. Furthermore, there was also a significant degradation of nozzle health when using Ink N. Thus, Ink N was considered to be unacceptable with respect to decap performance.

While the present technology has been described with reference to certain examples, those skilled in the art will appreciate that various modifications, changes, omissions, and substitutions can be made without departing from the disclosure. It is intended, therefore, that the disclosure be limited only by the scope of the following claims.

What is claimed is:

1. An ink composition, comprising:
   carbon black pigment;
   from 50 wt % to 80 wt % water;
   from 15 wt % to 35 wt % organic solvent;
   from 0.25 wt % to 9 wt % free latex particles having an average particles size from 50 nm to 500 nm;
   from 0.1 wt % to 1 wt % C10 to C20 fatty acid, wherein the C10 to C20 fatty acid includes from 0.09 wt % to 0.9 wt % of a saturated fatty acid and from 0.01 wt % to 0.1 wt % of an unsaturated fan acid based on a total weight of the ink composition; and
   lithium.

2. The ink composition of claim 1, further comprising from 0.5 wt % to 4 wt % polyurethane.

3. The ink composition of claim 1, wherein the free latex particles are present in the ink composition at from 3 wt % to 9 wt %.

4. The ink composition of claim 3, wherein the ink composition is devoid of polyurethane.

5. The ink composition of claim 1, wherein the C10 to C20 fatty acid comprises oleic acid; linoleic acid, undecanoic acid, lauric acid, tridecanoic acid, or a combination thereof.

6. The ink composition of claim 1, wherein the lithium is introduced from a source selected from lithium chloride, lithium bromide, lithium iodide, lithium hydroxide, lithium acetate, lithium benzoate, lithium nitrate, lithium counterion of the carbon black pigment, or a combination thereof, wherein the lithium is in the form of a lithium ion or lithium salt, and wherein the lithium is present in the ink composition at from 0.005 wt % to 0.5 wt %.

7. The ink composition of claim 1, wherein the organic solvent includes 1-(2-hydroxyethyl)-2-pyrrolidone, 2-pyrrolidone, or a combination thereof.

8. A method of making an ink composition, comprising admixing carbon black pigment, free latex particles, C10 to C20 fatty acid, and lithium with a liquid vehicle including water and organic solvent, wherein the admixing results in an ink composition comprising from 50 wt % to 80 wt % water, from 0.25 wt % to 9 wt % free latex particles having an average particles size from 50 nm to 500 nm, and from 0.1 wt % to 1 wt % C10 to C20 fatty acid, wherein the C10 to C20 fatty acid includes from 0.09 wt % to 0.9 wt % of a saturated fatty acid and from 0.01 wt % to 0.1 wt % of an unsaturated fatty acid based on a total weight of the ink composition.

9. The method of claim 8, wherein admixing further comprises adding from 0.5 wt % to 4 wt % polyurethane based on the ink composition content.

10. The method of claim 8, wherein the free latex particles are present in the ink composition at from 3 wt % to 9 wt %, and wherein the ink composition is devoid of polyurethane.

11. The method of claim 8, further comprising a preliminary step of surface treating the carbon black pigment to form a surface ionized carbon black pigment for admixing with the liquid vehicle.

12. The method of claim 8, wherein:
the C10 to C20 fatty acid comprises oleic acid, linoleic acid, undecanoic acid, lauric acid, tridecanoic acid, or a combination thereof; and
the lithium is introduced from a source selected from lithium chloride, lithium bromide, lithium iodide, lithium hydroxide, lithium acetate, lithium benzoate, lithium nitrate, lithium counterion of the carbon black pigment, or a combination thereof, wherein the lithium is in the form of a lithium ion or lithium salt, and wherein the lithium is present in the ink composition at from 0.005 wt % to 0.5 wt %.

13. A printing system, comprising:
an ink composition, comprising:
carbon black pigment,
from 50 wt % to 80 wt % water,
from 15 wt % to 35 wt % organic solvent,
from 0.25 wt % to 9 wt % free latex particles having an average particles size from 50 nm to 500 nm,
from 0.1 wt % to 1 wt % C10 to C20 fatty acid, wherein the C10 to C20 fatty acid includes from 0.09 wt % to 0.9 wt % of a saturated fatty acid and from 0.01 wt % to 0.1 wt % of an unsaturated fatty acid based on a total weight of the ink composition, and
lithium; and
a fuser device to apply heat and pressure to a print medium having the ink composition printed thereon.

14. The printing system of claim 13, wherein the ink composition further comprises 0.5 wt % to 4 wt % polyurethane.

15. The printing system of claim 13, wherein the fuser device includes a roller, and the roller contributes to providing the heat to the print medium at from 80° C. to 230° C. and the pressure to the print medium at from 50 psi to 500 psi.

16. The printing system of claim 13, wherein the free latex particles are present in the ink composition at from 3 wt % to 9 wt %.

17. The printing system of claim 16, wherein the ink composition is devoid of polyurethane.

18. The printing system of claim 13, wherein the C10 to C20 fatty acid comprises oleic acid, linoleic acid, undecanoic acid, lauric acid, tridecanoic acid, or a combination thereof.

19. The printing system of claim 13, wherein the lithium is introduced from a source selected from lithium chloride, lithium bromide, lithium iodide, lithium hydroxide, lithium acetate, lithium benzoate, lithium nitrate, lithium counterion of the carbon black pigment, or a combination thereof, wherein the lithium is in the form of a lithium ion or lithium salt, and wherein the lithium is present in the ink composition at from 0.005 wt % to 0.5 wt %.

20. The printing system of claim 13, wherein the organic solvent includes 1-(2-hydroxyethyl)-2-pyrrolidone, 2-pyrrolidone, or a combination thereof.

* * * * *